United States Patent [19]

Blahak et al.

[11] 4,096,101

[45] Jun. 20, 1978

[54] PROCESS FOR THE PRODUCTION OF CHEMICALLY AFTER-CROSS-LINKED POLYURETHANE RESINS

[75] Inventors: Johannes Blahak, Cologne; Kuno Wagner, Leverkusen; Jan Mazánek, Cologne; Hanns Peter Muller, Leverkusen; Artur Reischl, Dormagen, all of Germany

[73] Assignee: Bayer Aktiengesellschaft, Leverkusen, Germany

[21] Appl. No.: 814,828

[22] Filed: Jul. 12, 1977

[30] Foreign Application Priority Data

Jul. 24, 1976 Germany .............................. 2633457

[51] Int. Cl.$^2$ ................................................ C08J 9/00
[52] U.S. Cl. .......................... 260/2.5 BE; 260/37 N; 260/838; 260/849; 260/857 R; 260/858
[58] Field of Search .................. 260/2.5 BE, 838, 849, 260/857 R, 858, 37 N

[56] References Cited

U.S. PATENT DOCUMENTS

| | | | |
|---|---|---|---|
| 3,384,606 | 5/1968 | Dieterich et al. ............... | 260/849 X |
| 3,869,413 | 3/1975 | Blankenship ................... | 260/2.5 BE |
| 4,042,537 | 8/1977 | Dahm et al. ...................... | 260/858 X |
| 4,049,590 | 9/1977 | Falkenstein et al. ........... | 260/2.5 BE |

*Primary Examiner*—Lewis T. Jacobs
*Attorney, Agent, or Firm*—Gene Harsh; Joseph C. Gil; William E. Parry

[57] ABSTRACT

This invention relates to a process for making optionally cellular cross-linked elastomeric polyurethane resins from (a) polyisocyanates,
(b) higher molecular weight polyhydroxyl and/or polyamino compounds containing filler particles,
(c) chain lengthening agents and, optionally,
(d) blowing agents, catalysts and other additives known per se, wherein filler particles capable of being cross-linked with the formaldehyde are used and wherein the elastomeric polyurethanes which contain fillers are cross-linked with formaldehyde or formaldehyde releasing compounds, after the chain lengthening reaction has been substantially completed.

4 Claims, No Drawings

PROCESS FOR THE PRODUCTION OF CHEMICALLY AFTER-CROSS-LINKED POLYURETHANE RESINS

BACKGROUND OF THE INVENTION

It is known that polyisocyanates can be reacted with higher molecular weight polyols such as polyesters, polyethers, polycarbonates and/or polyamines as well as chain lengthening agents such as low molecular weight polyols and/or polyamines, optionally in the presence of water, blowing agents, catalysts, emulsifiers, stabilizers and other auxiliary agents such as fillers and pigments, to produce various high molecular weight polyurethane or polyurea resins depending on the formulations employed. The products obtained are suitable for use as elastomers, foam resins, foils or adhesives depending on their engineered properties.

In all of the products obtained, the physical properties are primarily determined by so-called "hard segments" (blocks of urethane or urea groups) and secondarily by the "soft segments" (residues of higher molecular weight polyols or polyamines). The mechanical properties of the polyurethane resins produced from the usual starting components, for example their tensile strength, elongation at break, elasticity and compression resistance, are unsatisfactory for many purposes. A substantial improvement is generally obtained by including among the starting materials higher molecular weight polyhydroxyl compounds in which various synthetic resins (polymers, polycondensates or polyisocyanate polyaddition products) are dispersed in finely divided form. Processes of this kind have been described, for example, in German Offenlegungsschriften Nos. 1,769,869; 2,014,385; 2,324,134 and 2,423,984 and in U.S. Pat. Nos. 2,993,013 and 3,869,413.

Even in these improved synthetic resins, however, the tendency of the polyurethanes to show undesirable deviations in their elastic properties under long term stress, in particular a marked permanent elongation, is a disadvantage which still exists. For this reason, such polyurethane resins are quite unsuitable for use as tires, for example, because the centrifugal forces would progressively loosen the structure of the polymer so that the tire would eventually burst.

It would be an obvious expedient to overcome this undesirable tendency of polyurethanes to creep by increasing the degree of chemical cross-linking, of example by using an excess of isocyanate or by using trifunctional starting components. However, an increase in the degree of cross-linking is accompanied by a sharp increase in the brittleness of polyurethanes. This manifests itself in a marked drop in tensile strength, dimensional stability and elongation at break. Furthermore, the preparation of prepolymers from polyfunctional starting compounds is accompanied by a sharp rise in viscosity and frequently also by coagulation.

DESCRIPTION OF THE INVENTION

It has now surprisingly been found that, when elastomeric polyurethanes which contain fillers capable of being cross-linked with formaldehyde are subjected to a process of chemical after-cross-linking with formaldehyde or formaldehyde releasing substrates, they give rise to synthetic resins which have none of the disadvantages described above. It is important, however, that this chemical after-cross-linking with formaldehyde should take place substantially only after the chain lengthening reaction (i.e. after formation of the hard segments). This can be more easily achieved by adding the cross-linking agent only after the chain lengthening agent or by using masked formaldehyde compounds from which formaldehyde can be released by the controlled action of heat after the termination of the chain lengthening reaction.

The present invention thus relates to a process for the production of optionally cellular, cross-linked elastomeric polyurethane resins from
 (a) polyisocyanates,
 (b) higher molecular weight polyhydroxyl and/or polyamino compounds containing filler particles,
 (c) chain lengthening agents and, optionally,
 (d) blowing agents, catalysts and other additives known per se,
wherein filler particles capable of being cross-linked with the formaldehyde are used and wherein the elastomeric polyurethanes which contain fillers are cross-linked with formaldehyde or formaldehyde releasing compounds, after the chain lengthening reaction has been substantially completed.

The fillers used according to the invention are preferably aminoplasts and/or phenoplasts which may contain ionic groups and/or polyureas and/or polyhydrazo dicarbonamides.

The novel elastomers obtained in this way are distinguished by excellent physical properties, improved resistance to hydrolysis and greatly reduced elongation under permanent mechanical stress.

The formaldehyde donors used are preferably methylol ethers of melamine, preferably tri- and hexamethylol ether, as well as methylol ethers of urea, thiourea, alkylene urea and acetylene diurea, acid amines, polymers and copolymers containing methylol ether groups, preferably polymers and copolymers of acrylic acid amide, but also paraformaldehyde or trioxane.

In principle, any compounds which are capable of controlled liberation of reactive aldehyde or keto groups at elevated temperatures are suitable for the purpose of the invention.

The quantity of formaldehyde (or formaldehyde releasing compound) used according to the invention is generally from 0.001 to 10% by weight, preferably 0.01 to 1% by weight, most preferably 0.05 to 0.5% by weight, based on the quantity of higher molecular weight polyhydroxyl and/or polyamine compounds.

The polyisocyanates used as starting components according to the invention may be aliphatic, cycloaliphatic, araliphatic, aromatic or heterocyclic polyisocyanates such as those described, for example, by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and any mixtures of these isomers; 1-isocyanato-3,3,5-trimethyl-5-isocyanatomethylcyclohexane (German Auslegeschrift No. 1,202,785 and U.S. Pat. No. 3,401,190); hexahydrotolylene-2,4-diisocyanate and -2,6-diisocyanate and any mixtures of these isomers; hexahydrophenylene-1,3-diisocyanate and/or 1,4-diisocyanate; perhydrodiphenyl methane-2,4'-diisocyanate and/or 4,4'-diisocyanate; phenylene-1,3-diisocyanate and -1,4-diisocyanate; tolylene-2,4-diisocyanate and -2,6-diisocyanate and any mixtures of these isomers; diphenylmethane-2,4'-diisocyanate and/or 4,4'-diisocyanate; naphthylene-1,5-diisocyanate;

triphenylmethane-4,4',4"-triisocyanate; polyphenyl-polymethylene polyisocyanates which can be obtained by aniline/formaldehyde condensation followed by phosgenation and which have been described, for example, in British Pat. Nos. 874,430 and 848,671; m- and p-isocyanatophenylsulphonyl-sulphonyl isocyanates as described in U.S. Pat. No. 3,454,606; perchlorinated aryl polyisocyanates such as those described, for example, in U.S. Pat. No. 3,277,138; polyisocyanates having carbodiimide groups as described in U.S. Pat. No. 3,152,162; diisocyanates of the kind described in U.S. Pat. No. 3,492,330; polyisocyanates with allophanate groups as described, e.g. in British Pat. No. 994,890, Belgian Pat. No. 761,626 and published Dutch Patent Application No. 7,102,524; polyisocyanates with isocyanate groups, e.g. as described in U.S. Pat. No. 3,001,973, German Pat. Nos. 1,022,789, 1,222,067 and 1,027,394 and in German Offenlegungsschriften Nos. 1,929,034 and 2,004,048; polyisocyanates with urethane groups as described e.g. in Belgian Pat. No. 752,261 or U.S. Pat. No. 3,394,164; polyisocyanates with acylated urea groups as described in German Pat. No. 1,230,778; polyisocyanates with biuret groups as described e.g. in U.S. Pat. Nos. 3,124,605 and 3,201,372, and British Pat. No. 889,050; polyisocyanates prepared by telomerization reactions as described, for example, in U.S. Pat. No. 3,654,106; polyisocyanates having ester groups such as those described, for example, in British Pat. Nos. 965,474 and 1,072,956, U.S. Pat. No. 3,567,763 and German Pat. No. 1,231,688; reaction products of the above mentioned isocyanates with acetals as described in German Pat. No. 1,072,385; and polyisocyanates containing polymeric fatty acid groups as described in U.S. Pat. No. 3,455,883.

The distillation residues obtained from the commercial production of isocyanates which contain isocyanate groups may also be used, optionally as solutions in one or more of the above mentioned polyisocyanates. Any mixtures of the above mentioned polyisocyanates may also be used.

As a general rule, it is particularly preferred to use readily available polyisocyanates such as tolylene-2,4-diisocyanate and -2,6-diisocyanate and any mixtures of these isomers ("TDI"); polyphenyl-polymethylene polyisocyanates of the kind which can be prepared by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

The higher molecular weight starting components (b) used according to the invention include compounds, generally with molecular weights of 400 to 16,000, and which have at least two hydrogen atoms capable of reacting with isocyanates. These compounds may contain amino, thiol or carboxyl groups but are preferably polyhydroxyl compounds, and in particular compounds having from 2 to 8 hydroxyl groups, especially those with a molecular weight of from 800 to 10,000 and preferably 1000 to 6000. Examples include e.g. polyesters, polyethers, polythioethers, polyacetals, polycarbonates and polyester amides having at least 2, generally 2 to 8, but preferably 2 to 4 hydroxyl groups, of the kind generally known for the production of both homogeneous and cellular polyurethane. Difunctional compounds are particularly preferred.

Suitable polyesters with hydroxyl groups include e.g. reaction products of polyvalent, and preferably divalent alcohols, to which trivalent alcohols may be added, and polyvalent, preferably divalent, carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated.

The following are mentioned as examples: Succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid, maleic acid anhydride; fumaric acid; dimeric and trimeric fatty acids such as oleic acid which may be mixed with monomeric fatty acids; dimethyl terephthalate and terephthalic acid-bis-glycol esters. The following are examples of suitable polyvalent alcohols; Ethylene glycol; propylene glycol-(1,2) and -(1,3); butylene glycol-(1,4) and -(2,3); hexanediol-(1,6), octanediol-(1,8); neopentylglycol; cyclohexanedimethanol (1,4-bis-hydroxymethylcyclohexane); 2-methyl-1,3-propane diol, glycerol; trimethylolpropane; hexanetriol-(1,2,6); butanetriol-(1,2,4); trimethylolethane; pentaerythritol; quinitol; mannitol, and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones such as $\epsilon$-caprolactone or hydroxycarboxylic acids such as $\omega$-hydroxycaproic acid may also be used.

The polyethers used according to the invention which have at least 2, generally 2 to 8 and preferably 2 to 3 hydroxyl groups are also known per se and are prepared, for example, by polymerization of epoxides such as ethylene oxide, propylene oxide, butylene oxide, tetrahydrofuran, styrene oxide or epichlorohydrin, either alone, e.g. in the presence of boron trifluoride, or by addition of these epoxides, either as mixtures or successively, to starting components having reactive hydrogen atoms, such as water, alcohols, ammonia or amines. Suitable alcohols and amines include ethylene glycol, propylene glycol-(1,3) or -(1,2), trimethylolpropane, 4,4'-dihydroxydiphenylpropane, aniline, ethanolamine or ethylene diamine. Sucrose polyethers may also be used according to the invention, e.g. those described in German Auslegeschriften Nos. 1,176,358 and 1,064,938. It is in many cases preferred to use polyethers which contain predominant amines of primary hydroxyl groups (up to 90% by weight, based on all the hydroxyl groups present in the polyether). Polyethers modified with vinyl polymers, e.g. the compounds obtained by polymerization of styrene or acrylonitrile in the presence of polyethers (U.S. Pat. Nos. 3,383,351, 3,304,273, 3,523,093 and 3,110,695 and German Pat. No. 1,152,536) are also suitable, as well as polybutadienes which have hydroxyl groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde.

Suitable polyacetals for the purpose of the invention may also be prepared by the polymerization of cyclic acetals.

The polycarbonates with hydroxyl groups used may be of the kind generally known, for example, those which can be prepared by the reaction of diols such as propanediol-(1,3), butanediol-(1,4) and/or hexanediol-(1,6), diethylene glycol, triethylene glycol or tetraethylene glycol with diarylcarbonates, e.g. with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products of alkylene oxides and phenol formaldehyde resins or of alkylene oxides and urea formaldehyde resins are also suitable for the purpose of the invention.

Representatives of these compounds, which may be used according to the invention are known and have been described, for example, in High Polymers, Vol. XVI, "Polyurethanes, Chemistry and Technology" by Saunders-Frisch, Interscience Publishers, New York, London, Volume I, 1962, pages 32–42 pages 44–54 and Volume II, 1964, pages 5–6 and 198–199 and in Kunststoff-Handbuch, Volume VII, Vieweg-Hochtlen, Carl-Hanser-Verlag, Munich, 1966 on pages 45 to 71.

Mixtures of the above mentioned compounds which contain at least two hydrogen atoms capable of reacting with isocyanates and having molecular weights of from 400 to 10,000 may, of course, also be used, for example mixtures of polyethers and polyesters.

The chain lengthening agents, compounds (c), used according to the invention may be compounds with a molecular weight of from 32 to 400 which have at least two hydrogen atoms capable of reacting with isocyanates. These compounds are also understood to be compounds containing hydroxyl groups and/or amino groups and/or thiol groups and/or carboxyl groups, preferably hydroxyl groups and/or amino groups, which serve as chain lengthening agents or cross-linking agents. These compounds generally have from 2 to 8 hydrogen atoms capable of reacting with isocyanates, preferably 2 or 3 such hydrogen atoms. The following are examples of such compounds: Ethylene glycol, propylene glycol-(1,2), and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-1,3-propanediol, glycerol, trimethylol propane, hexanetriol-(1,2,6), trimethyloletheane, pentaerythritol, quinitol, mannitol and sorbitol, diethylene glycol, triethylene glycol, tetraethylene glycol, polyethylene glycols with a molecular weight of up to 400, dipropylene glycol, polypropylene glycols with a molecular weight of up to 400, dibutylene glycol, polybutylene glycols with a molecular weight of up to 400, 4,4'-dihydroxy-diphenyl propane, dihydroxymethylhydroquinone, ethanolamine, diethanolamine, triethanolamine, 3-aminopropanol.

Aliphatic diamines suitable for the purpose of the invention include, for example, ethylene diamine, tetramethylene-1,4-diamine, undecamethylene-1,11-diamine, dodecamethylene-1,12-diamine and mixtures thereof, 1-amino-3,3,5-trimethyl-4-aminomethylcyclohexane, hexahydrotolylene-2,4- and -2,6-diamine and mixtures thereof, perhydro-2,4'- and -4,4'-diaminodiphenylmethane, p-xylylene diamine, bis-(3-aminopropyl)-methylamine, etc.. Hydrazine and substituted hydrazines such as methyl hydrazine, N,N'-dimethylhydrazine and their homologues as well as acid dihydrazides may also be used according to the invention, e.g. carbohydrazide, oxalic acid dihydrazide, the hydrazides of malonic acid, succinic acid, glutaric acid, adipic acid, $\beta$-methyl adipic acid, sebacic acid, hydracrylic acid and terephthalic acid, semicarbazidoalkylene hydrazides such as $\beta$-semicarbazido-propionic acid hydrazide (German Offenlegungsschrift No. 1,770,591), semicarbazido-alkylene-carbazic esters such as 2-semicarbazidoethyl-carbazic ester (German Offenlegungsschrift No. 1,918,504) or also amino-semicarbazido compounds such as $\beta$-aminoethylsemicarbazido carbonate (German Offenlegungsschrift No. 1,902,931).

Examples of suitable aromatic diamines include bisanthranilic acid esters according to German Offenlegungsschrift Nos. 2,040,644 and 2,160,590; 3,5- and 2,4-diaminobenzoic acid esters according to German Offenlegungsschrift No. 2,025,900; the diamine with ester groups described in German Offenlegungsschrift Nos. 1,803,635; 2,040,650 and 2,160,589; 3,3'-dichloro-4,4'-diamino-diphenyl methane and 4,4'-diaminodiphenyl disulphide.

If, according to a preferred variation of the invention, the reaction injection molding process is employed, highly reactive aromatic diamines are used as chain lengthening agents. These include, for example, tolylene diamines, diphenylmethane diamine and alkylated phenylene diamines or diphenylmethane diamine. Compounds of these kinds have been described, for example, in German Offenlegungsschrift No. 2,622,951.

Chain lengthening agents which may be used according to the invention also include compounds such as 1-mercapto-3-aminopropane, substituted or unsubstituted amino acids such as glycine, alanine, valine, serine and lysine and substituted or unsubstituted dicarboxylic acids such as succinic acid, adipic acid, phthalic acid, 4-hydroxyphthalic acid and 4-aminophthalic acid.

Compounds which are monofunctional in their reaction with isocyanates may also be used as so-called chain breaking agents in proportions of from 0.01 to 10% by weight, based on the polyurethane solids content. Monofunctional compounds of this kind include e.g. monoamines such as butylamine and dibutylamine, octylamine, stearylamine, N-methylstearylamine, pyrrolidine, piperidine and cyclohexylamine, monoalcohols such as butanol, 2-ethylhexanol, octanol, dodecanol, the various amyl alcohols, cyclohexanol, ethyleneglycol monoethyl ether, etc.

As already mentioned above, it is essential to the invention that the higher molecular weight compounds which have groups capable of reacting with isocyanate groups (generally polyhydroxyl and/or polyamino compounds) contain, in a finely dispersed or dissolved form, polyadducts or polycondensates which are capable of being cross-linked with formaldehyde. These polyadducts or polycondensates optionally contain ionic groups. Modified polyhydroxyl compounds of this kind can easily be obtained, for example by reacting polyisocyanates (e.g. the compounds mentioned above) with ammonia and/or the above-mentioned chain lengthening agents in the polyhydroxyl compound in situ. Processes of this kind have already been described, for example, in German Auslegeschrift Nos. 1,168,075 and 1,260,142 and in German Offenlegungsschriften Nos. 2,423,984; 2,513,815; 2,550,796; 2,550,797; 2,550,833 and 2,550,862. Phenoplast and/or aminoplast dispersions may be prepared in a similar manner by reaction in situ in polyhydroxyl compounds as described in German Offenlegungsschriften No. 2,324,134 and 2,512,385. Alternatively, dispersions of polymers capable of being cross-linked with formaldehyde may be mixed with the higher molecular weight compound containing groups which are reactive with isocyanates, water being subsequently removed from the mixture. Processes of this kind have been described in German Offenlegungsschrift No. 2,550,860 and U.S. Pat. No. 3,869,413.

As already mentioned above, the fillers which are cross-linked according to the invention are preferably aminoplasts, phenoplasts, polyhydrazodicarbonamides and polyureas. Fillers already containing methylol groups, which may be etherified may also be used. Examples include copolymers of vinyl monomers and of the N-methylol compound or preferably the N-methylol-alkyl ether of a saturated urethane or bisurethane.

Particularly suitable cross-linking components are the N-methylol compounds or corresponding alkyl ethers or alkyl esters of unsaturated urethanes or bisurethanes of the general formula I $$RCH=\underset{R^2}{\overset{R^1}{C}}-COOCH_2\underset{CH_2OR^4}{\overset{}{CH}}-OCON-R^3 \qquad (I)$$

in which

R represents hydrogen or methyl,

R$^1$ represents hydrogen, methyl or the group

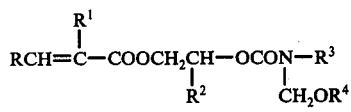

R$^2$ represents hydrogen, methyl, phenyl or haloalkyl such as —CH$_2$Cl,

R$^3$ represents hydrogen; or a straight or branched chain C$_{1-6}$-alkyl group, preferably a C$_{1-4}$-alkyl group, a cycloalkyl group, preferably one having 6 carbon atoms, or a phenyl group which may be substituted; and R$^4$ represents hydrogen; a straight or branched chain C$_{1-6}$-alkyl group, preferably methyl; or a group of the formula

in which

R$^5$ represents a straight or branched chain C$_{1-6}$alkyl group, preferably a C$_1$–C$_3$ alkyl group.

The following are examples of particularly preferred unsaturated N-methylol compounds:

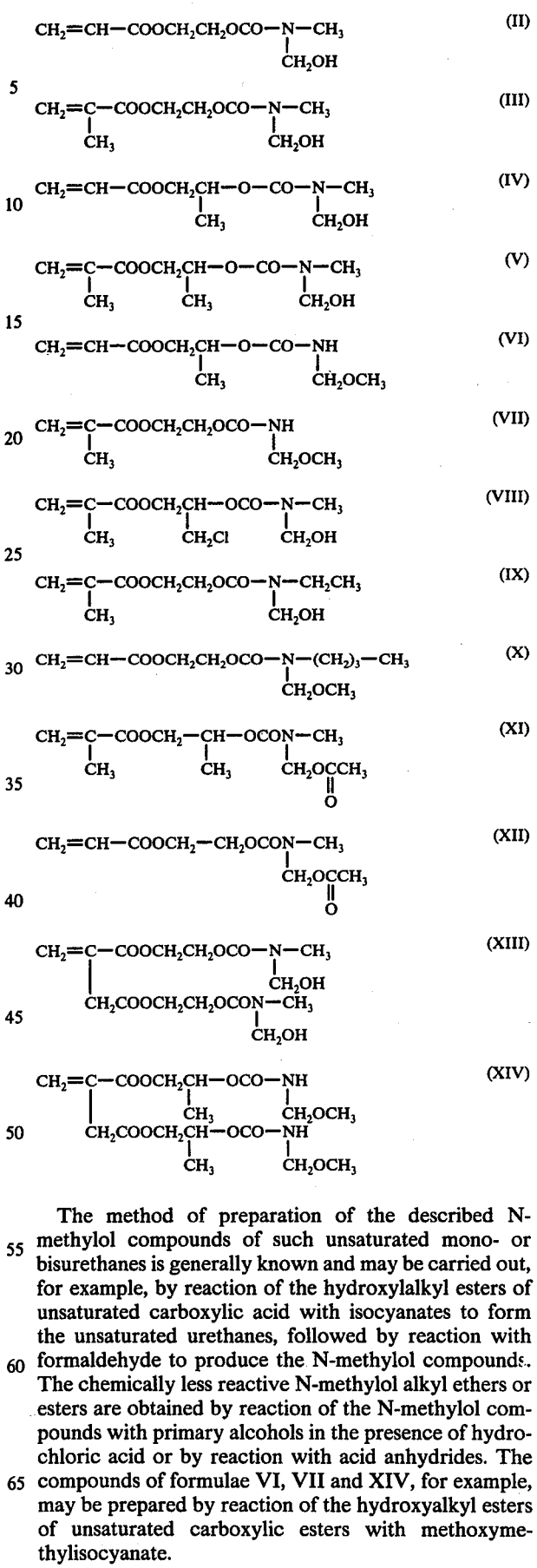

The method of preparation of the described N-methylol compounds of such unsaturated mono- or bisurethanes is generally known and may be carried out, for example, by reaction of the hydroxylalkyl esters of unsaturated carboxylic acid with isocyanates to form the unsaturated urethanes, followed by reaction with formaldehyde to produce the N-methylol compounds. The chemically less reactive N-methylol alkyl ethers or esters are obtained by reaction of the N-methylol compounds with primary alcohols in the presence of hydrochloric acid or by reaction with acid anhydrides. The compounds of formulae VI, VII and XIV, for example, may be prepared by reaction of the hydroxyalkyl esters of unsaturated carboxylic esters with methoxymethylisocyanate.

Another group of suitable N-methylol compounds which represent N-methylol compounds of urethane-containing derivatives of unsaturated carboxylic acids correspond to the general formula XV

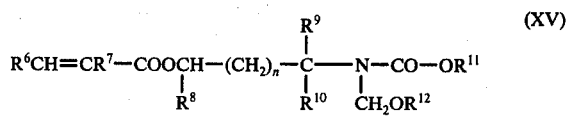

in which $R^6$ represents hydrogen or methyl;
$R^7$ represents hydrogen, methyl or the group

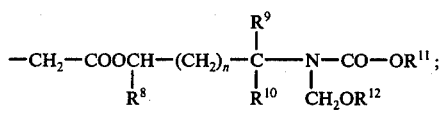

$R^8$ represents hydrogen or methyl, $R^9$ and $R^{10}$, which may be the same or different, represent hydrogen or $C_1$-$C_4$-alkyl;

$R^{11}$ represents a straight or branched chain $C_1$-$C_{18}$-alkyl group, preferably a $C_1$-$C_6$ alkyl group, $R^{12}$ represents hydrogen or a straight or branched chain $C_1$-$C_6$ alkyl group or a group of the formula

in which $R^{13}$ represents a $C_1$-$C_6$ alkyl group, preferably a $C_1$-$C_3$ alkyl group, and $n$ represents 0, 1 or 2.

The following are examples of such unsaturated N-methylol compounds:

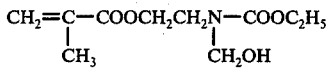 (XVI)

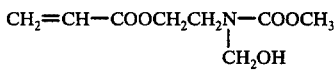 (XVII)

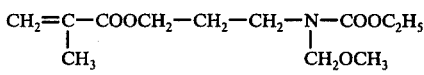 (XVIII)

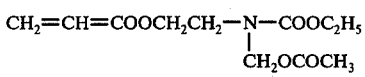 (XIX)

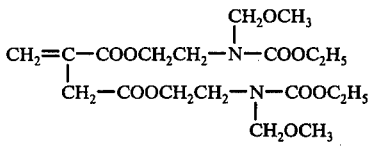 (XX)

Unsaturated N-methylol compounds of general formula XV are prepared by the reaction of an unsaturated ester isocyanate known in the literature (German Pat. No. 1,018,050) with an alcohol to produce an unsaturated ester urethane, followed by reaction with formaldehyde to yield the corresponding N-methylol compounds. Chemically less reactive N-methylol alkyl ethers or esters may be prepared by reaction of the N-methylol compounds with primary alcohols in the presence of acids or by reaction with acid anhydrides, preferably acetic acid anhydride.

According to the invention, polymeric fillers which cannot be cross-linked with formaldehyde (e.g. natural or synthetic rubber, polyethylene, polychloroprene, polyvinylchloride, polyacylates, copolymers and graft copolymers of styrene, butadiene and acrylonitrile, etc.) may, of course, be used in addition to the fillers which can be cross-linked with formaldehyde (in proportions of 0 to 70% by weight, preferably 0 to 50% by weight, based on the total quantity of fillers). The preparation of such modified higher molecular weight compounds having groups which are reactive with isocyanates has also been described in the documents mentioned above.

The dispersions of filler particles which can be cross-linked are preferably prepared in a higher molecular weight polyhydroxyl compound as dispersing agent, most preferably in a polyether polyol. Since such dispersions can be prepared in a highly concentrated form (solids content up to about 70% by weight) by the process mentioned above, they may, if desired, be diluted to the desired solids content with other higher molecular weight compounds of the type described above which contain hydrogen atoms capable of reacting with isocyanates. Alternatively, part or all of the polyhydroxyl compounds used as dispersing agents may be converted into higher molecular weight compounds having amino end groups, for example, by reaction with isatoic acid anhydride. Processes of this kind have been described, for example, in German Offenlegungsschriften Nos. 2,019,432; 2,160,590 and 2,619,840.

The higher molecular weight compounds containing fillers and isocyanate reactive groups which are used as starting components for the polyisocyanate polyaddition process according to the invention have a solids content, made up of polymers which can be cross-linked with formaldehyde and, optionally, also polymers which cannot be cross-linked with formaldehyde, of about 5 to 70% by weight, preferably 10 to 30% by weight.

The products produced according to the invention are preferably homogeneous polyurethane molded elastomers which can be subjected to heavy material wear (e.g. shoe soles or motor car tires). Cross-linked polyurethane foams with good mechanical properties can also be produced by the principals of the process of the present invention.

Water and/or easily volatile organic substances may be used as blowing agents. Suitable organic blowing agents include, for example, acetone, ethyl acetate and halogen substituted alkanes such as methylene chloride, chloroform, ethylidene chloride, vinylidene chloride, monofluorotrichloromethane, chlorodifluoromethane, and dichlorodifluoromethane as well as butane, hexane, heptane and diethyl ether. The effect of a blowing agent can also be obtained by the addition of compounds which decompose at temperatures above room temperatures to release gases such as nitrogen, e.g. azo compounds such as azoisobutyric acid nitrile. Further examples of blowing agents and the use of blowing agents have been described in Kunststoff-Handbuch, Volume VII, published by Vieweg and Hochtlen, Carl-Hanser-Verlag, Munich 1966, e.g. on pages 108 and 109, 453 to 455 and 507 to 510.

Catalysts are also frequently used according to the invention. The catalysts added are known per se. Examples include tertiary amines such as triethylamine, tributylamine, N-methylmorpholine, N-ethylmorpholine, N-cocomorpholine, N,N,N',N'-tetramethylethylenediamine, 1,4-diazabicyclo(2,2,2)-octane, N-methyl-N'-dimethylaminoethyl-piperazine, N,N-dimethylbenzylamine, bis-(N,N-diethyl-aminoethyl)-adipate, N,N-diethylbenzylamine, pentamethyl-diethylene-triamine, N,N-dimethylcyclohexylamine, N,N,N',N'-tetramethyl-1,3-butanediamine, N,N-dimethyl-β-phenylethylamine, 1,2-dimethylimidazole and 2-methylimidiazole. Mannich bases known per se may also be used and are obtained from secondary amines such as dimethylamine and aldehydes, preferably formaldehyde, or ketones such as acetone, methyl ethyl ketone or cyclohexanone and phenols such as phenol, nonyl phenol or bisphenol.

Further catalysts which may be used are tertiary amines having hydrogen atoms which are reactive with isocyanate groups. These include triethanolamine, triisopropanolamine, N-methyl-diethanolamine, N-ethyldiethanolamine, N,N-dimethylethanolamine and their reaction products with alkylene oxides such as propylene oxide and/or ethylene oxide.

Silaamines having carbon-silicon bonds as described e.g. in German Pat. No. 1,229,290 (corresponding to U.S. Pat. No. 3,620,984) may also be used as catalysts, e.g. 2,2,4-trimethyl-2-silamorpholine or 1,3-diethylaminomethyl-tetramethyl-disiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable.

Organic metal compounds may also be used as catalysts, in particular organic tin compounds. These are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above mentioned catalysts may, of course, be used as mixtures.

Further examples of catalysts which may be used according to the invention and details concerning the activity of the catalysts are given in Kunststoff-Handbuch, Volume VII, published by Vieweg and Hochtlen, Carl-Hanser-Verlag, Munich 1966, e.g. on pages 96 to 102.

The catalysts are generally used in a quantity of between about 0.001 and 10% by weight, based on the quantity of compounds with a molecular weight of from 400 to 16,000 which have at least two hydrogen atoms capable of reacting with isocyanates.

Surface active additives such as emulsifiers and foam stabilizers may also be used. Suitable emulsifiers include e.g. the sodium salts of ricinoleic sulphonate or salts of fatty acids with amines such as oleic acid diethylamine or stearic acid diethanolamine. Alkali metal or ammonium salts of sulphonic acids such as dodecylbenzenesulphonic acid or dinaphthylmethane disulphonic acid or of fatty acids such as ricinoleic acid or of polymeric fatty acids may also be used as surface active additives.

Suitable foam stabilizers are particularly the polyether siloxanes, and especially those which are water-soluble. These compounds generally have a polydimethyl siloxane group attached to a copolymer of ethylene oxide and propylene oxide. Foam stabilizers of this kind have been described, for example, in U.S. Pat. Nos. 2,834,748, 2,917,480 and 3,629,308.

Other additives whih may also be used include reaction retarders, e.g. substances which are acid in reaction such as hydrochloric acid or organic acid halides; cell regulators known per se such as paraffins or fatty alcohols or dimethyl polysiloxanes; pigments; dyes; flame retarding agents known per se such as trischloroethylphosphate, tricresyl phosphate or ammonium phosphate and polyphosphate; stabilizers against ageing and weathering, plasticizers, fungistatic and bacteriostatic substances and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the invention and details concerning their use and mode of action may be found in Kunststoff-Handbuch, Volume VII, published by Vieweg and Hochtlen, Carl-Hanser-Verlag, Munich 1966, e.g. on pages 103 to 113.

According to the invention, the components are reacted together by the known one-shot prepolymer or semiprepolymer process, often using mechanical devices such as those described in U.S. Pat. No. 2,764,565. Details concerning processing apparatus which may also be used according to the invention may be found in Kunststoff-Handbuch, Volume VII, published by Vieweg and Hochtlen, Carl-Hanser-Verlag, Munich 1966, e.g. on pages 121 to 205.

In a preferred variation of the process according to the invention, the components are processed by reaction injection molding, e.g. as described in German Offenlegungsschrift No. 2,622,951.

According to the invention, the foaming reaction for producing foam products is often carried out inside molds. In this process, the reaction mixture is introduced into a mold which may be made of a metal such as aluminum or a plastics material such as an epoxide resin, and it foams up inside the mold to produce the shaped product. This process of foaming in molds may be carried out to produce a product having a cellular structure on its surface or it may be carried out to produce a product having a compact skin and cellular core. According to the invention, the desired result can be obtained by either introducing just sufficient foamable reaction mixture to fill the mold with foam or introducing a larger quantity of reaction mixture than is necessary to fill the mold with foam. The second method is known as "overcharging", a procedure which has already been disclosed, e.g. in U.S. Pat. Nos. 3,178,490 and 3,182,104.

So-called external mold release agents known per se, such as silicone oils, are frequently used when foaming is carried out inside molds but the process may also be carried out with the aid of so-called internal mold release agents, if desired in combination with external mold release agents, e.g. as disclosed in German Offenlegungsschriften Nos. 2,121,670 and 2,307,589.

Cold setting foams may also be produced according to the invention (see British Pat. No. 1,162,517 and German Offenlegungsschrift No. 2,153,086).

Foams may, of course, also be produced by the process of block foaming or by the laminator process known per se.

The following Examples serve to explain the process according to the invention. The figures given represent parts by weight and percentages by weight unless otherwise indicated.

EXAMPLES

EXAMPLE 1

Prepolymer A 2113 g (1 mol) of a linear polypropylene oxide polyol in which 50% by weight of a polyhydrazodicarbonamide from tolylene diisocyanate (80% 2,4- and 20% 2,6-isomer) and hydrazine are dispersed (prepared according to the general procedure of Example 1 c of German Offenlegungsschrift No. 2 550 796 from 20 parts, by weight, of the polyether, 16,9 parts, by weight, of tolylene diisocyanate and 3,1 parts, by weight, of hydrazine) are prepolymerized for 30 minutes with 365.4 g of tolylene diisocyanate (80% 2,4- and 20% 2,6-isomer) at 120° C. The isocyanate content finally obtained is 3.73% by weight.

2000 g (1 mol) of a linear polypropylene oxide polyol are prepolymerized with 365.4 g of the same isocyanate under the same conditions as prepolymer A.

Process According to the Invention 94.6 g of prepolymer A and 113 g of prepolymer B are together heated to 90° C and then put under a vacuum of 15 Torr for 1 minute to remove the air stirred into the mixture. 19.4 g of 4-chloro-3,5-diamino-benzoic acid isobutyl ester are then stirred in for 30 seconds until homogenized, followed by 0.39 g of melamine-hexamethylol ether within a further 30 seconds, and the resulting mixture is poured into a mold which has been preheated to 100° C. An elastomer having the following properties is obtained after 24 hours of heating at 120° C:

| Tensile strength | (DIN 53504) | 15.0 | (MPa) |
|---|---|---|---|
| Elongation on tearing | (DIN 53504) | 255 | (%) |
| Dimensional stability | (DIN 53504) | 430 | (N) |
| Shore-Hardness A | (DIN 53505) | 89 | |
| Elasticity | (DIN 53512) | 45 | (%) |
| $\sigma 100\%$ | (DIN 53504) | 8.28 | (MPa) |
| Permanent elongation | (DIN 53504) | 9 | (%) |

COMPARISON EXAMPLE

The procedure is the same as that described in Example 1, but the addition of melamine-hexamethylol ether is carried out before the reaction mixture is heated to 90° C, i.e. before the addition of chain lengthening agent. In this case, an elastomer having the following properties is obtained under otherwise identical reaction conditions:

| Tensile strength | (DIN 53504) | 11.50 | (MPa) |
|---|---|---|---|
| Elongation on tearing | (DIN 53504) | 177 | (%) |
| Dimensional stability | (DIN 53504) | 310 | (N) |
| Shore-hardness A | (DIN 53505) | 85 | |
| Elasticity | (DIN 53512) | 41 | (%) |
| $\sigma 100\%$ | (DIN 53504) | 8.0 | (MPa) |
| Permanent elongation | (DIN 53504) | 19 | (%) |

EXAMPLE 2

The procedure is the same as that described in Example 1 but using ten times the quantity of melamine hexamethylol ether. An elastomer having the following properties is obtained:

| Tensile strength | (DIN 53504) | 14.0 | (MPa) |
|---|---|---|---|
| Elongation on tearing | (DIN 53504) | 236 | (%) |
| Dimensional stability | (DIN 53504) | 335 | (N) |
| Shore-hardness A | (DIN 53505) | 88 | |
| Elasticity | (DIN 53512) | 43 | (%) |
| Permanent elongation | (DIN 53504) | 8 | (%) |

EXAMPLE 3

The procedure is the same as that described in Example 1 but using the appropriate quantity of hydrazodicarbonamide hexamethylol ether as cross-linking agent. An elastomer having the following properties is obtained:

| Tensile strength | (DIN 53504) | 15.2 | (MPa) |
|---|---|---|---|
| Elongation on tearing | (DIN 53504) | 310 | (%) |
| Dimensional stability | (DIN 53504) | 390 | (N) |
| Shore-hardness A | (DIN 53505) | 90 | |
| Elasticity | (DIN 53512) | 46 | (%) |
| Permanent elongation | (DIN 53504) | 9 | (%) |

EXAMPLE 4

The procedure is the same as that described in Example 1 but using 0.8 g of melamine trimethylol ether as cross-linking agent. An elastomer having the following properties is obtained:

| Tensile strength | (DIN 53504) | 15.2 | (MPa) |
|---|---|---|---|
| Elongation at break | (DIN 53504) | 258 | (%) |
| Dimensional stability | (DIN 53504) | 365 | (N) |
| Shore-hardness A | (DIN 53505) | 89 | |
| Elasticity | (DIN 53512) | 43 | (%) |

EXAMPLE 5

The procedure is the same as that described in Example 1 but the filler used is an aminoplast dispersion in polypropylene oxide prepared according to German Offenlegungsschrift No. 2,324,134, Example 1, and having a solids content of 30%. 0.6 g of acetylene-bis-urea-tetramethylol ether are added as chemical after-cross-linking agent.

An elastomer having the following properties is obtained:

| Tensile strength | (DIN 53504) | 14.0 | (MPa) |
|---|---|---|---|
| Elongation at break | (DIN 53504) | 310 | (%) |
| Dimensional stability | (DIN 53504) | 330 | (N) |
| Shore-hardness A | (DIN 53505) | 86 | |
| Elasticity | (DIN 53512) | 47 | (%) |

EXAMPLE 6

(a) Preparation of a Polyether:

Polyaddition of propylene oxide to trimethylol propane used as starter is carried out in the presence of catalytic quantities of sodium alcoholate. Polyaddition of ethylene oxide is then carried out in a second stage of the process. The liquid polyether contains primary hydroxyl groups and has a hydroxyl number of about 35. The viscosity of the polyether is 870 mPas at 20° C.

(b) Preparation of an Aminoplast Dispersion

Using a 60 liter vessel of stainless steel, 26,500 parts of the polyether described above are introduced therein and heated to 45° C with stirring. Traces of oxygen are removed by means of a water-jet vacuum. The stirrer vessel is repeatedly flushed with nitrogen for this purpose. It is then again evacuated, and addition of the reactive solution described below is begun as soon as the reaction temperature reaches 45° C. The reactive solution described below is introduced into the vessel within 60 minutes at 43–47° C and 20–30 Torr. The water of solution should be rapidly distilled off at the same time. After addition of the reactive solution, the vessel is kept at 43°–47° C for one more hour and the temperature is then raised from 47° C to 100° C during a further hour and then from 100° to 140° C during a further 30 minutes. The vessel is then stirred at this temperature for 2 hours under vacuum (20 Torr).

At the end of this time, the contents of the vessel are cooled to 100° C and neutralized by the addition of 200 parts of 25% aqueous ammonia. At the same time, the aminoplast condensates are freed from excess methylol groups. The contents of the vessel are heated to 100° C for a further 30 minutes with vigorous stirring under a vacuum and then to 140° C for 30 minutes. Stirring is then continued while the temperature is allowed to drop. A very finely divided aminoplast dispersion (16% solids content) having a blue tinge is obtained. The viscosity of the dispersion is about 2000 mPas/25° C. The dispersed particles mainly have a diameter of 0.2 to 0.5 μ. The water content of the dispersion is 0.08% $H_2O$.

Preparation of the Reactive Solution 2160 parts of urea are dissolved in 2920 parts of 37% aqueous formaldehyde solution at room temperature. To this solution are added 2270 parts of melamine and a further 4380 parts of 37% formalin solution and the mixture is heated to 60° C with stirring. 36 parts of normal sodium hydroxide are added to the melamine suspension at this temperature. The reaction temperature is then raised until a clear solution is obtained. 2000 parts of the polyether described under (a) are then added to the solution and the vessel is cooled. 66.4 parts of 85% phosphoric acid are then added to the solution with stirring.

(c) Preparation of a Foam (Process According to the Invention)

380 parts of the dispersion prepared according to (b), 220 parts of the polyether described under (a), 30 parts of melamine hexamethylol ether, 18 parts of water, 1.2 parts of triethylene diamine, 5 parts of N-methylmorpholine, 1.2 parts of tin dioctoate, 0.3 parts of a commercial polyether polysiloxane stabilizer and 6 parts of a commercial silicone oil for improving the surface areas of the foam are mixed together. To this mixture are added 220 parts of an isocyanate mixture of 80% by weight of tolylene diisocyanate (80% 2,4- and 20% 2,6-isomer) and 20% by weight of a crude 4,4'-diisocyanatodiphenyl methane and the components are vigorously mixed with the aid of a high speed stirrer. The resulting reaction mixture is poured into a 40 × 40 × 12.5 cm metal mold which has been preheated to 40° C, and the mold is closed with a lid. No heat is supplied to the mold from outside. The molded product is removed after 8 minutes. The highly elastic, open celled foam obtained has the following properties:

| (Tested in accordance with ASTM D 1564-71) | |
|---|---|
| Gross density | 41 kg/m$^3$ |
| Tensile strength | 145 KPa |
| Change in tensile strength after | |
| hot air ageing (22 h at 140° C) | + 14 % |

-continued

| | |
|---|---|
| Elongation at break | 155 % |

What is claimed is:

1. A process for the production of cross-linked elastomeric, optionally cellular polyurethane resins comprising reacting:
    (a) polyisocyanates,
    (b) higher molecular weight polyhydroxyl and/or polyamino compounds containing filler particles.
    (c) chain lengthening agents wherein said filler particles are capable of being cross-linked with formaldehyde and wherein the elastomeric polyurethanes containing fillers are cross-linked with formaldehyde or formaldehyde releasing compounds after the chain lengthening reaction has been essentially completed.

2. The process of claim 1 wherein the filler is selected from the group consisting of (a) aminoplasts and/or phenoplasts which may contain ionic groups, (b) polyureas and (c) polyhydrazodicarbonamides.

3. The process of claim 1 wherein said formaldehyde releasing cross-linking compounds are of the general formula:

$$RCH=\overset{R^1}{\underset{}{C}}-COOCH_2\underset{R^2}{\overset{}{CH}}-O\underset{CH_2OR^4}{\overset{}{CON}}-R^3$$

in which
R represents hydrogen or methyl,
R$^1$ represents hydrogen, methyl or the group $$-CH_2COOCH_2\underset{R^2}{\overset{}{CH}}-O\underset{CH_2OR^4}{\overset{}{CON}}-R^3$$

R$^2$ represents hydrogen, methyl, phenyl or haloalkyl
R$^3$ represents hydrogen; or a straight or branched chain C$_{1-6}$-alkyl group, a cycloalkyl group, or a phenyl group which may be substituted; and
R$^4$ represents hydrogen; a straight or branched chain C$_{1-6}$-alkyl group, or a group of the formula $$-\underset{O}{\overset{}{\underset{\|}{C}}}-R^5$$

in which
R$^5$ represents a straight or branched chain C$_{1-6}$alkyl group.

4. The process of claim 1 wherein said formaldehyde cross-linking agent is of the general formula:

$$R^6CH=CR^7-COOCH-(CH_2)_n-\underset{R^{10}}{\overset{R^9}{\underset{|}{C}}}-\underset{CH_2OR^{12}}{\overset{}{N}}-CO-OR^{11}$$
$$\phantom{R^6CH=CR^7-COOCH}\underset{R^8}{|}$$

in which
R$^6$ represents hydrogen or methyl;
R$^7$ represents hydrogen, methyl or the group

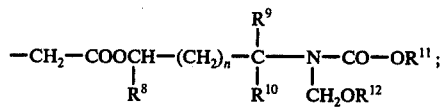
$R^8$ represents hydrogen or methyl,
$R^9$ and $R^{10}$, which may be the same or different, represent hydrogen or $C_1$–$C_4$-alkyl;
$R^{11}$ represents a straight or branched chain $C_1$–$C_{18}$-alkyl group,
$R^{12}$ represents hydrogen or a straight or branched chain $C_1$–$C_6$ alkyl group or a group of the formula
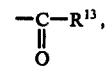
in which
$R^{13}$ represents a $C_1$–$C_6$ alkyl group, and
$n$ represents 0, 1 or 2.
* * * * *